United States Patent
Viens et al.

(10) Patent No.: US 10,286,719 B2
(45) Date of Patent: May 14, 2019

(54) METHOD OF MANUFACTURING A PART WITH AN ANTI-COUNTERFEIT FEATURE AND A PART MARKED FOR ANTI-COUNTERFEITING

(71) Applicant: Sikorsky Aircraft Corporation, Stratford, CT (US)

(72) Inventors: Daniel V. Viens, Mansfield Center, CT (US); Joseph V. Mantese, Ellington, CT (US); Wayde R. Schmidt, Pomfret Center, CT (US)

(73) Assignee: SIKORSKY AIRCRAFT CORPORATION, Stratford, CT (US)

( * ) Notice: Subject to any disclaimer, the term of this patent is extended or adjusted under 35 U.S.C. 154(b) by 67 days.

(21) Appl. No.: 15/521,807

(22) PCT Filed: Nov. 4, 2015

(86) PCT No.: PCT/US2015/058980
§ 371 (c)(1),
(2) Date: Apr. 25, 2017

(87) PCT Pub. No.: WO2016/073571
PCT Pub. Date: May 12, 2016

(65) Prior Publication Data
US 2017/0232779 A1    Aug. 17, 2017

Related U.S. Application Data

(60) Provisional application No. 62/075,332, filed on Nov. 5, 2014.

(51) Int. Cl.
*G02B 5/18* (2006.01)
*B42D 25/378* (2014.01)
(Continued)

(52) U.S. Cl.
CPC ......... *B42D 25/378* (2014.10); *B42D 25/324* (2014.10); *B42D 25/36* (2014.10);
(Continued)

(58) Field of Classification Search
CPC ............. G02B 5/18; G02B 2005/1804; G02B 5/1809; G02B 5/32; G02B 27/42;
(Continued)

(56) References Cited

U.S. PATENT DOCUMENTS 6,226,109 B1 * 5/2001 Tompkin ............ G11B 7/00736
359/19
6,753,952 B1    6/2004 Lawrence et al.
(Continued)

FOREIGN PATENT DOCUMENTS

WO    2011097495 A1    8/2011

OTHER PUBLICATIONS

International Search Report and Written Opinion of the International Search Authority dated May 16, 2016 in related PCT Application No. PCT/US2015/058980, 7 pages.
(Continued)

Primary Examiner — Arnel C Lavarias
(74) Attorney, Agent, or Firm — Cantor Colburn LLP

(57) ABSTRACT

A method of manufacturing a part with an anti-counterfeit feature is provided. The method includes providing a part to be marked for anti-counterfeiting. The part is provided with a radiation impacting feature on or within the part. The radiation impacting feature is configured to at least one of (i) prevent accurate imaging of at least a portion of the part and (ii) provide unique authentication of the part.

13 Claims, 1 Drawing Sheet

(51) Int. Cl.
    *B42D 25/36*     (2014.01)
    *B42D 25/324*    (2014.01)
    *G02B 5/02*      (2006.01)
    *B42D 25/405*    (2014.01)
(52) U.S. Cl.
    CPC ......... *B42D 25/405* (2014.10); *G02B 5/0205*
            (2013.01); *G02B 5/0268* (2013.01); *G02B
                                          5/0252* (2013.01)
(58) Field of Classification Search
    CPC ........ G02B 27/48; G03H 1/00; G03H 1/0005;
                    G03H 1/0011; G03H 2001/0016; G03H
                                  2001/0022; G03H 2001/0027
    USPC ...... 359/558, 1, 2, 566, 569; 283/72, 85, 86,
                                          283/74, 81, 92, 93
    See application file for complete search history.

(56)            References Cited

U.S. PATENT DOCUMENTS 8,081,359  B2   12/2011  Heierli et al.
    8,585,222  B1   11/2013  Bernath et al.
    2007/0164117 A1  7/2007  Swiler et al.
    2009/0127475 A1  5/2009  Lamberterie

OTHER PUBLICATIONS

EESR of EP 15857922.7, dated Apr. 11, 2018, 6 pages.

\* cited by examiner

METHOD OF MANUFACTURING A PART WITH AN ANTI-COUNTERFEIT FEATURE AND A PART MARKED FOR ANTI-COUNTERFEITING

CROSS-REFERENCE TO RELATED APPLICATIONS

The present application is a 371 National Stage of International Patent Application No. PCT/US2015/058980, filed on Nov. 4, 2015, which claims priority to U.S. Provisional Application No. 62/075,332, filed on Nov. 5, 2014, the contents of which are incorporated herein by reference in their entirety.

BACKGROUND OF THE INVENTION

The embodiments herein generally relate to prevention of counterfeiting and product authentication and, more particularly, to methods and processes of marking products for identification and/or to prevent 3-D scanning and copying of products.

Product, component, and part counterfeiting is becoming an increasingly more difficult problem faced by manufacturers. Counterfeiters not only copy music, videos, software, drugs, and fashion, they have also extended their abilities to enable the copying of manufactured products, including automotive, aircraft, aircraft engine, helicopter, elevator, and climate control components and parts. The counterfeit parts may be virtually identical in appearance to certified parts, especially when coupled with counterfeit packaging. Thus, it may be extremely difficult to differentiate between a counterfeit part or component and a brand name, original, or certified part or component. For example, differentiation may only be possible with very costly analysis and processes to examine a component or part to determine if it is a counterfeit or an original.

The counterfeit parts may be interchangeable with and may easily be intermingled with existing supply chains of certified parts. While the counterfeit parts may be interchangeable or at least substantially interchangeable, the counterfeit parts may suffer quality issues and performance issues that affect the safety of the product in which the parts are used. As such, the manufacturer of the product could be held responsible for part failure or injury if the manufacturer cannot prove a defective part's origin. Further, the manufacturer may ultimately be held responsible to ensure the quality of their product, regardless of part origin. Thus counterfeiting exposes the manufacturer to potentially added liability and production costs. Further, it is estimated that more than $650B in global sales are lost to counterfeit goods annually with more than $200B in the United States, and 92% of Fortune 500 companies are affected by counterfeiting.

One of the common technologies for copying parts is the use of measuring techniques using 3D scanning processes like Coordinate Measurement Machines (CMMs), laser scanners, x-ray scanners, structured light digitizers, industrial CT scanners, and similar devices. These techniques rely on directing electromagnetic radiation at the surface of or passing electromagnetic radiation through the part to create an image. This results in a pixilated digital image of the part in three dimensions which can then be converted into a solid model using mathematical techniques. Traditional Computer Aided Design (CAD) and Computer Aided Manufacturing (CAM) are then employed to fabricate a counterfeit part based on the digital image generated during scanning of the product, part, or component.

In order to reduce liability and cost to manufacturers, various solutions have been proposed. For example, anti-counterfeiting approaches have included embedding RFID tags and/or employing sophisticated holograms to enable determination of the source of a part or component. Such holograms have been marketed by DuPont, under the trademark IZON™, which is a 3D security hologram that is easily authenticated, but difficult to duplicate. The 3D security hologram can be applied to a surface of a component or part, and the 3D hologram can be observed to determine authenticity regarding source of manufacturing of a component or part.

BRIEF DESCRIPTION OF THE INVENTION

According to one embodiment, a method of manufacturing a part with an anti-counterfeit feature is provided. The method includes providing a part to be marked for anti-counterfeiting. The part is provided with a radiation impacting feature on or within the part. The radiation impacting feature is configured to at least one of (i) prevent accurate imaging of at least a portion of the part and (ii) provide unique authentication of the part.

In addition to one or more of the features described above, or as an alternative, further embodiments may include that the radiation impacting feature is provided at least one of (i) on an external surface of the part, (ii) on an internal surface of the part, (iii) within a subsurface of the part, and (iv) within a material that forms a portion of the part. Further, in some embodiments, the radiation impacting feature may comprise at least one of an embedded material, a fluorescent material, a micro-facet, a micro-structure, an emissive material, and a phosphorescent material. Further, in some embodiments the step of providing the radiation impacting feature may comprise at least one of cutting, polishing, machining, depositing material, embossing, stamping, and micro-stamping the at least one surface.

According to other embodiments, the prevention of an accurate imaging may be provided by at least one of distortion, redirection, reflection, refraction, transmission, diffraction, and absorption of electromagnetic radiation directed at the radiation impacting feature. Further, in some embodiments, the radiation impacting feature may form a pattern. Also, in some embodiments, the radiation impacting feature may not be visible to the naked eye.

According to another embodiment, a part is provided that is marked for anti-counterfeiting. The part includes a radiation impacting feature located on or within the part, wherein the radiation impacting feature is configured to at least one of (i) prevent accurate imaging of the at least a portion of the part and (ii) provide unique authentication of the part.

In addition to one or more of the features described above, or as an alternative, further embodiments may include that the radiation impacting feature may be located at least one of (i) on an external surface of the part, (ii) on an internal surface of the part, (iii) within a subsurface of the part, and (iv) within a material that forms a portion of the part. Furthermore, in some embodiments, the radiation impacting feature may be at least one of an embedded material, a fluorescent material, a micro-facet, a micro-structure, an emissive material, and a phosphorescent material. Further, in some embodiments, the radiation impacting feature may be configured to at least one of distort, redirect, reflect, refract, transmit, diffract, and absorb electromagnetic radiation directed at the radiation impacting feature. In some embodiments, the radiation impacting feature may define a pattern. Further, in some embodiments, the radiation impacting feature may not be visible to the naked eye.

Technical effects of embodiments of the invention include preventing copying of parts and components of products using 3-D scanning techniques. Further technical effects of embodiments allow for improved product, part, and/or component authentication and certification.

BRIEF DESCRIPTION OF THE DRAWINGS

The subject matter which is regarded as the invention is particularly pointed out and distinctly claimed in the claims at the conclusion of the specification. The foregoing and other features and advantages of the invention are apparent from the following detailed description taken in conjunction with the accompanying drawings in which:

DETAILED DESCRIPTION OF THE INVENTION

Embodiments of the invention disclosed herein provide various approaches that make the process of copying and/or counterfeiting of products, parts, and/or components (hereinafter "part" or "parts") difficult or impossible by applying a radiation impacting feature to a surface, subsurface, interior portion, or the materials of a part that results in a feature that provides a unique image when viewed with a scanning device. The scanning device may be any type of electromagnetic scanning device, including, but not limited to, CMMs, laser scanners, x-ray scanners, structured light digitizers, and/or industrial CT scanners, hereinafter "scanning device." The result of the radiation impacting feature, in accordance with embodiments disclosed herein, is a scan and/or resultant solid model of a poorly defined structure requiring a high degree of costly post-scan processing to reconstruct the actual real-world structure of the part, i.e., the scan does not accurately represent the physical characteristics of the scanned part.

Figure 1B:
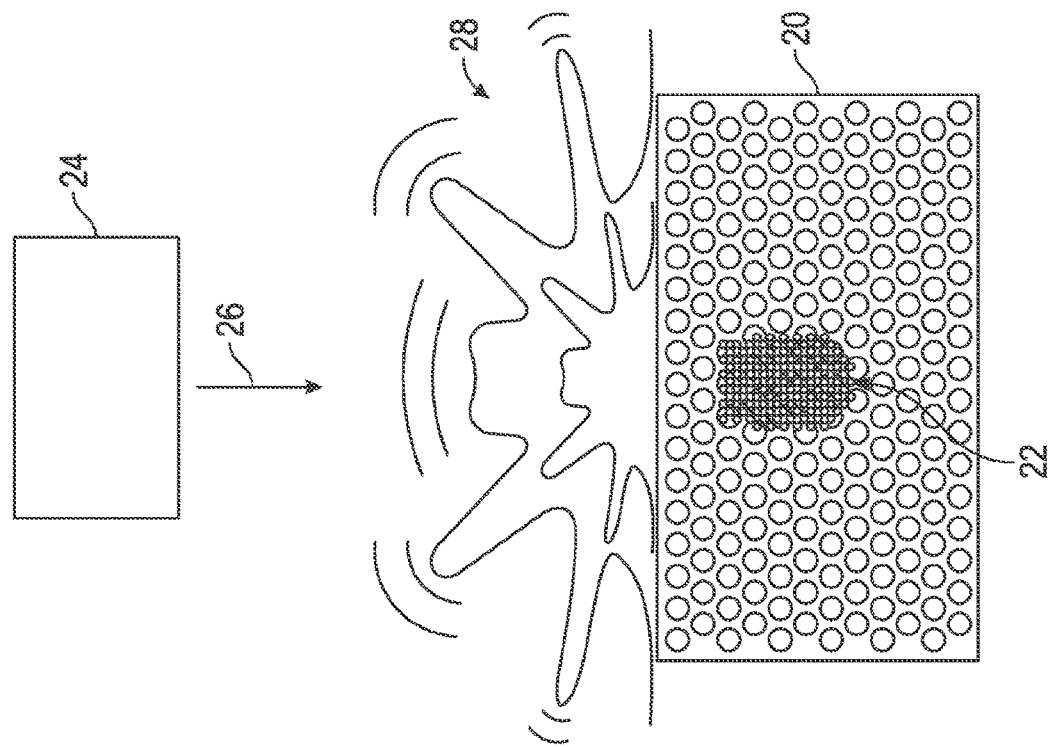
FIG. 1B is an illustration of the disruption of electromagnetic radiation reflecting off of a surface of a part including a radiation impacting feature in accordance with the present invention.
Figure 1A:
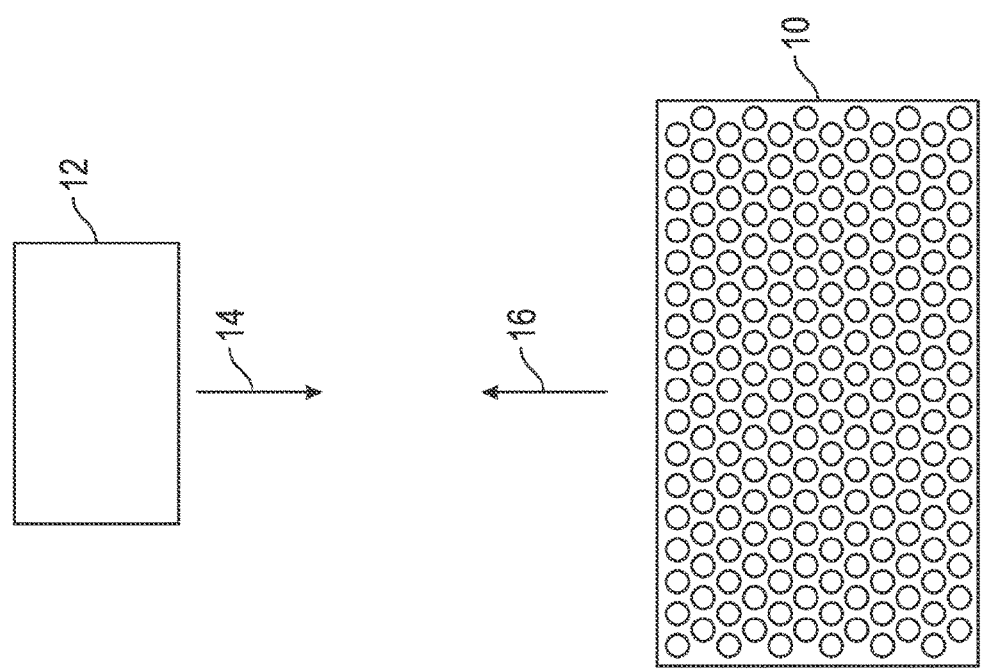
FIG. 1A is an illustration of electromagnetic radiation reflecting off of a surface of a part without features of the invention.

For example, referring to FIGS. 1A and 1B, illustrated are illustrations of exemplary impacts on electromagnetic radiation as applied or directed to a part. As shown in FIG. 1A, a part 10 is provided to be copied or verified for source of manufacture, i.e., authenticated. A scanning device 12 or other electromagnetic radiation source and/or detector are provided to scan the part 10. Electromagnetic radiation 14 is transmitted from the scanning device 12 and provided incident to a surface of the part 10. The incident electromagnetic radiation 14 is then reflected off of the surface of the part 10 as reflected electromagnetic radiation 16. The scanning device 12 then receives the reflected electromagnetic radiation 16 and records and/or processes information regarding the surface characteristics of the part 10. The recorded and/or processed information can then be used to create a digital model of the part 10 using a computer and known techniques. With this digital model a copy or counterfeit part can be manufactured. In the embodiment of FIG. 1A, the scan/digital model generated by scanning device 12 could be used to make an exact copy of the part 10.

The counterfeiting process involves using electromagnetic radiation sources that are reflected off the surfaces of the part (FIG. 1A) or transmitted through the part to detect the exact shape of the part. However, scanning techniques are not practical for complicated and/or complex geometries. Complex geometries result in scans that do not provide an adequate copy or representation of the scanned part. Therefore, including features on or in a part that distort and/or absorb electromagnetic radiation directed at the part will increase the complexity of the scan, and thus prevent accurate copying. For example, if a feature is added to a part that reflects and/or scatters electromagnetic radiation, the resultant pixilated image would not be representative of the original part that was scanned. The distortions could be subtle, rather than dramatic, and the copied part may only have a slight deviation from the original but would not fit with mating parts, thus preventing a counterfeit part from entering the market and being installed into products.

Now, referring to FIG. 1B, a part 20 is provided with a radiation impacting feature 22 on a surface of the part 20, on a subsurface of the part 20, or embedded within the part 20. As used herein a radiation impacting feature is any type of surface, subsurface, near-surface, embedded, or interior feature that impacts or affects electromagnetic radiation either reflected from a surface or that passes through a surface of the part. Exemplary impacts by radiation impacting features upon electromagnetic radiation may be distortion, redirection, reflection, refraction, transmission, refraction, and/or absorption of the electromagnetic radiation when it hits the surface and/or tries to pass therethrough. A radiation impacting feature may also be formed as a feature that is emissive and/or fluorescent, with the impact being additional electromagnetic radiation detected by a scanning device 24 during a scan. The radiation impacting feature, in some embodiments, may be configured to not be visible to the naked eye.

As such, when the scanning device 24 is used to provide incident electromagnetic radiation 26 onto the surface of part 20 to capture an image from reflected electromagnetic radiation 28, the reflected electromagnetic radiation 28 does not represent the physical reflective properties of the surface of the part 20 and a "bad" scan or solid model is generated. As shown in FIG. 1B, the reflected electromagnetic radiation 28 is scattered and/or distorted at the point on the surface where the radiation impacting feature 22 is present.

FIG. 1B merely shows a single representative illustration of how the electromagnetic radiation may be impacted by the radiation impacting feature 22. However, as noted, the electromagnetic radiation impact may be one of absorption, such that no electromagnetic radiation or a reduced amount of electromagnetic radiation is reflected back toward the scanning device, or fails to pass through the part, depending on the type of incident electromagnetic radiation. Those of skill in the art will recognize that different effects are possible depending on the type of radiation impacting feature employed.

For example, in a first exemplary embodiment, the radiation impacting feature may be formed by the use of photonic or electromagnetic radiation impacting structures such as micro-grids/nano-grids which are physical structures that may be surface, subsurface, interior, and/or embedded structures that impact the scanning of the part. These photonic structures may create surface and/or sub-surface de-coherence. The local reflections from the photonic structures create local enhancements that distort the specularly reflected image resulting in local distortion and inaccuracies when creating a scan or solid model copy.

In an alternative embodiment, laser speckle may be used as the radiation impacting feature. Laser speckle arises from micro-facets in a surface that create constructive interference at a scanning device. The presence of laser speckle greatly distorts the image reconstructed at the detector because the micro-facets reflect the electromagnetic radiation at various different angles, preventing an accurate representation of the greater surface structure of a part. Micro-facets, and the resultant laser speckle, may be generated, for example, by cutting, polishing, machining, depositing material onto a surface of the part, embossing, stamping, and/or micro-stamping. Such application and formation of micro-facets on the surface of the part do not impact the structural and mechanical features and characteristics of the part itself or the greater shape, structure, and dimensions of the part but merely impact the reflection of the electromagnetic radiation from the part. During a deposition process, the speckle may naturally arise from the deposition process through control of a base pressure in a deposition chamber, control of the deposition rate, and/or selection of the material that is deposited on the surface of the part. When embossing or micro-stamping is employed, surface or subsurface texturing is applied to increase speckle, with the dimensions of the micro-faceting chosen to impede the ability to scan the dimensions of the part for counterfeiting.

In an alternative embodiment, a distorted image is created during scanning by employing a fluorescent material as the radiation impacting feature. The fluorescent material may be coated on the surface of the part or embedded within a surface coating of the part. The fluorescent material, for example, may take the form of polymers, paints, inks, or even simple inks such as those found in common highlighters. Upon excitation with the electromagnetic radiation from a scanning device, the molecules emitted from the fluorescent material flood the detectors with electromagnetic radiation thereby creating uncertainty in part dimension and position and destroy the integrity of the electromagnetic radiation scan.

As another embodiment, similar to fluorescence, phosphorescent materials may form the radiation impacting feature. A phosphorescent radiation impacting feature may be a simple chemical phosphor coated on the surface of the part and/or may be incorporated into the material surfaces of the part. With phosphorescence, the persistence of electromagnetic radiation emission in the absence of a stimulation source is provided to distort a scan or destroy the integrity thereof. Further, the inclusion of phosphors that continuously emit photons after interrogation by a scanning device could also be used to smear or distort the local specular signal and destroy the integrity of the scan or solid model.

As another embodiment, the radiation impacting feature may be formed from one or more materials that are different from the materials of the part, and thus provide an impact on electromagnetic radiation that is directed toward the part. For example, the radiation impacting feature may have a different density and/or composition. In the example of differing densities, materials with different densities will interact differently with incoming electromagnetic radiation, thereby producing a return signal at a sensor that can increase the difficulty to recreate an original part. Similarly, such features can be used to provide a specific and unique signature for identifying the part.

The above examples of radiation impacting features are merely exemplary. One of ordinary skill will readily appreciate that alternative features can be provided on surfaces of parts that result in similar outcomes when scanned by a scanning device. Thus the scope of the invention is not limited by the above described embodiments. Further, the radiation impacting features in accordance with the invention may be located on the surface, subsurface, or interiors of a part or portions thereof. Further, the radiation impacting feature may be embedded inside or within the material and/or structure of the part. Accordingly, the radiation impacting feature may be included during manufacturing of a part, or added to the part after manufacturing. If the radiation impacting feature is embedded or formed within a part, it may not be visible or detectable to an observer, and the only indication of the presence of the radiation impacting feature may be by its observed impact on the radiation during a scan.

As described above, the invention may be used for preventing copying of parts. However, as noted, the invention may also provide a means for authentication and certification of parts. The surface textures and features that prevent copying may also be used for part identification and/or authentication. A unique pattern of electromagnetic radiation reflection, electromagnetic radiation absorption, and/or electromagnetic radiation scattering could be employed to identify the source of a part. In essence, the features disclosed herein can provide unique "finger prints" for parts, thus allowing for unique authentication properties. For example, with reference to FIGS. 1A and 1B again, the part 10 does not include any identifying structure or electromagnetic radiation signature to identify the part 10 as a part from a specific source, i.e., there is no identifier of the manufacturer of the part 10. However, in FIG. 1B, the radiation impacting feature 22 provides a unique identifier or other type of signature that can be used to authenticate and/or certify that part 20 was produced by a manufacturer, or identify the source of the part 20. Thus, the radiation impacting feature can be used to both prevent counterfeiting and serve as a means for determining the source of a part.

Because radiation impacting features in accordance with embodiments of the invention may be added to a part based on, for example, structural features (e.g., size, shape, number), compositional differences, density variations and/or combinations thereof, the features can be positioned at specific points and/or locations on and/or within a part. This positioning of the radiation impacting feature allows for not only unique electromagnetic radiation patterns or impacts from the radiation impacting feature, but also allows for specific patterns of radiation impacting features on the part. For example, five small areas of a part may be marked with micro-facets to provide laser speckle. These areas will be prevented from copying because of the distortion in the imaging that results from the micro-facets, as described above. Additionally, the location of the five areas of speckle can provide a unique "finger print" to the manufacturer of the part. This unique combination can provide authentication and certification of the part.

During authentication, the part can be scanned with a scanning device, similar to those used for copying, and the presence of laser speckle at specific locations on the part can be determined. Alternatively, or in combination, the radiation impacting feature may produce a very specific electromagnetic radiation signature itself. In this case, the configuration of the electromagnetic radiation signature may serve as the proof of authenticity, i.e., a specific electromagnetic radiation pattern may be generated by the radiation impacting feature. A classification and/or reference system may be used to match parts with specific radiation impacting features and/or combinations, numbers, locations, etc., of radiation impacting features so that a part can be confirmed as authentic and/or if an apparently unidentifiable part is a counterfeit or not.

Although described above as a "surface" feature, the radiation impacting feature is not limited to an external surface of a part. For example, it is contemplated that the radiation impacting features described above can be applied to any surface of a part, whether it is internal or external to the part. The external radiation impacting features can be fabricated after the part is made, while radiation impacting features that are internal to the part can be fabricated during manufacture of the part. Such internally positioned radiation impacting features may be selected and fabricated to interact selectively with penetrating radiation (e.g., x-ray, electron beam, neutron beam, terahertz, microwave, gamma rays, etc.), rather than reflective radiation.

Advantageously, effective anti-counterfeiting and authentication are achieved by employing embodiments of the present invention. Various embodiments of the external and/or internal radiation impacting features of the invention provide unique and/or random features that prevent a scanning device from accurately scanning a surface when generating a digital file for counterfeit reproduction. Further, features of embodiments described herein provide unique and/or random signatures that enable authentication and/or identification of a source of goods, such as a manufacturing source for a part, a component, or a product.

While the invention has been described in detail in connection with only a limited number of embodiments, it should be readily understood that the invention is not limited to such disclosed embodiments. Rather, the invention can be modified to incorporate any number of variations, alterations, substitutions, combination, sub-combination, or equivalent arrangements not heretofore described, but which are commensurate with the spirit and scope of the invention. Additionally, while various embodiments of the invention have been described, it is to be understood that aspects of the invention may include only some of the described embodiments. For example, although the radiation impacting features have been described as formed in or on a surface of a part, those skilled in the art will appreciate that the radiation impacting features may be provided on a part in the form of a sticker, or other attachment that is attached to the part. Accordingly, the invention is not to be seen as limited by the foregoing description, but is only limited by the scope of the appended claims.

What is claimed is:

1. A method of manufacturing a part with an anti-counterfeit feature, comprising:
   providing the part to be marked for anti-counterfeiting; and
   providing a radiation impacting feature on or within the part, wherein the radiation impacting feature is configured to (i) prevent accurate imaging of at least a portion of the part and (ii) provide unique authentication of the part.

2. The manufacturing method of claim 1, wherein the radiation impacting feature is provided at least one of (i) on an external surface of the part, (ii) on an internal surface of the part, (iii) within a subsurface of the part, and (iv) within a material that forms a portion of the part.

3. The manufacturing method of claim 1, wherein the radiation impacting feature comprises at least one of an embedded material, a fluorescent material, a micro-facet, a micro-structure, an emissive material, and a phosphorescent material.

4. The manufacturing method of claim 1, wherein the step of providing the radiation impacting feature comprises at least one of cutting, polishing, machining, depositing material, embossing, stamping, and micro-stamping the part.

5. The manufacturing method of claim 1, wherein the prevention of accurate imaging is provided by at least one of distortion, redirection, reflection, refraction, transmission, diffraction, and absorption of electromagnetic radiation directed at the radiation impacting feature.

6. The manufacturing method of claim 1, wherein the radiation impacting feature forms a pattern.

7. The manufacturing method of claim 1, wherein the radiation impacting feature is not visible to an unaided eye.

8. A part marked for anti-counterfeiting, comprising:
   a radiation impacting feature located on or within the part, wherein the radiation impacting feature is configured to (i) prevent accurate imaging of at least a portion of the part and (ii) provide unique authentication of the part.

9. The part of claim 8, wherein the radiation impacting feature is located at least one of (i) on an external surface of the part, (ii) on an internal surface of the part, (iii) within a subsurface of the part, and (iv) within a material that forms a portion of the part.

10. The part of claim 8, wherein the radiation impacting feature comprises at least one of an embedded material, a fluorescent material, a micro-facet, a micro-structure, an emissive material, and a phosphorescent material.

11. The part of claim 8, wherein the radiation impacting feature is configured to at least one of distort, redirect, reflect, refract, transmit, diffract, and absorb electromagnetic radiation directed at the radiation impacting feature.

12. The part of claim 8, wherein the radiation impacting feature defines a pattern.

13. The part of claim 8, wherein the radiation impacting feature is not visible to an unaided eye.

* * * * *